Patented Oct. 17, 1922.

1,432,298

UNITED STATES PATENT OFFICE.

MAX PHILLIPS, OF EVANSVILLE, WISCONSIN; DEDICATED, BY MESNE ASSIGNMENTS, TO THE PEOPLE OF THE UNITED STATES.

MANUFACTURE OF SYNTHETIC THYMOL.

No Drawing.   Application filed February 25, 1922.   Serial No. 539,279.

(FILED UNDER THE ACT OF MARCH 3, 1883, 22 STAT. L., 625.)

*To all whom it may concern:*

Be it known that I, MAX PHILLIPS, a citizen of the United States, and an employee of the Department of Agriculture of the United States of America, residing in the city of Evansville, county of Rock, State of Wisconsin, whose post-office address is care of Department of Agriculture, Washington, D. C., have invented certain new and useful Improvements in the Manufacture of Synthetic Thymol, of which the following is a specification.

This application is made under the act of March 3, 1883, chaper 143 (22 Stat., 625) and the invention herein described and claimed may be used by the Government of the United States or any of its officers or employees in the prosecution of work for the Government, or any person in the United States, without payment to me of any royalty thereon.

The present invention relates to the production of thymol from cymidine sulphonic acid, 1-methyl-2-amino-3 or 5-sulphonic-4-isopropyl-benzene.

According to U. S. Patent No. 1,332,680, cymidine sulphonic acid is first diazotized, the diazo cymene sulphonic acid reduced with tin chloride, or with formic acid and powdered copper, and the cymene-3-sulphonic acid thus obtained fused with sodium hydroxide and thymol obtained. I have found that the conversion of cymidine sulphonic acid into thymol can best be accomplished by diazotizing the cymidine sulphonic acid, reducing the diazo cymene sulphonic acid with a strong sodium bisulphite solution, acidifying such solution with hydrochloric acid, getting cymyl hydrazine-3 or 5-sulphonic acid; then treating the hydrazine compound with copper sulphate or ferric chloride solution, whereupon the hydrazine group is completely removed and cymene-3-sulphonic acid ($CH_3$=1) is obtained. The sodium salt of this sulphonic acid when fused with either sodium or potassium hydroxides is converted into thymol.

The process of converting cymidine sulphonic acid into thymol is preferably carried out as follows: 23 parts of cymidine sulphonic acid is added to 100 parts of water and 5.5 parts sodium carbonate added. Twenty-five parts concentrated hydrochloric acid (sp. gr. 1.19) or 10 parts concentrated sulphuric acid (sp. gr. 1.84) is added in a fine stream and suspension thus obtained, cooled to about 5° C. and diazotized with sodium nitrite solution in the usual manner. The diazocymene sulphonic acid thus obtained is added to a cold sodium bisulphite solution, prepared by adding 30 parts sodium sulphite in 200 parts of water and saturating the solution with sulphur dioxide gas. The sodium bisulphite solution to which the diazo cymene sulphonic acid had been added, is heated to boiling and acidified with hydrochloric acid. On concentrating and cooling the solution, cymyl hydrazine sulphonic acid is obtained. This is added to a boiling 10% copper sulphate or ferric chloride solution gradually and in small portions. An evolution of nitrogen gas takes place and if copper sulphate is used metallic copper is deposited, which may be filtered off. The filtrate is neutralized with lime and the calcium salt of cymene-3-sulphonic acid ($CH_3$=1) then converted into the sodium salt by means of sodium carbonate. The sodium cymene sulphonate when fused with either sodium or potassium hydroxides is converted into thymol.

The reactions which take place in the process are conveniently represented as follows:

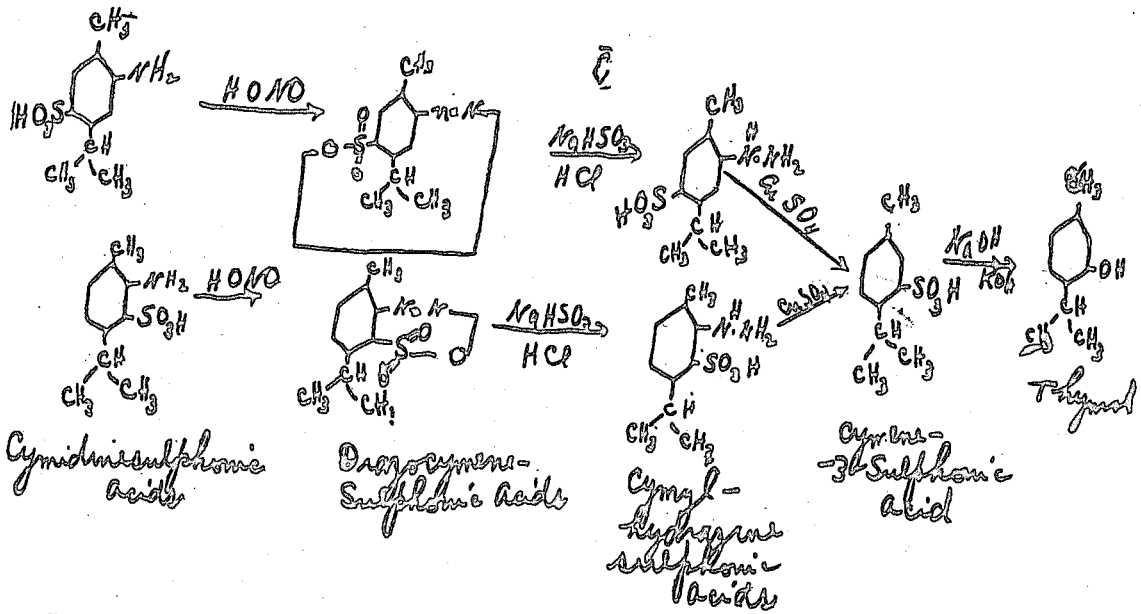

Having fully described my invention, what I claim and desire to protect by Letters Patent is:

1. The process of making thymol, comprising the diazotization of cymidine sulphonic acid, reducing the diazo cymene sulphonic acid with sodium bisulphite solution to cymyl hydrazine 3 or 5-sulphonic acid, eliminating the hydrazine group with copper sulphate, obtaining cymene 3-sulphonic acid, and fusing the sodium salt of cymene-3-sulphonic acid with sodium hydroxide.

2. The process of making thymol, comprising the diazotization of cymidine sulphonic acid, reducing the diazo cymene sulphonic acid with sodium bisulphite solution to cymyl hydrazine 3 or 5-sulphonic acid, eliminating the hydrazine group with ferric chloride solution, obtaining cymene 3-sulphonic acid, and fusing the sodium salt of cymene-3-sulphonic acid with potassium hydroxide.

In testimony whereof I affix my signature in the presence of two subscribing witnesses.

MAX PHILLIPS.

Witnesses:
MARSHALL J. GOSS,
GERALD H. MAINS.